Nov. 3, 1936.          P. J. SCHWARZHAUPT          2,059,816
                         VARIABLE CAPACITOR
                        Filed June 10, 1933

Inventor.
Paul J. Schwarzhaupt,
by Harry E. Dunham
His Attorney.

Patented Nov. 3, 1936

2,059,816

UNITED STATES PATENT OFFICE 2,059,816

VARIABLE CAPACITOR

Paul J. Schwarzhaupt, Scotia, N. Y., assignor to General Electric Company, a corporation of New York Application June 10, 1933, Serial No. 675,227

1 Claim. (Cl. 175—41.5)

My invention relates to capacitors and particularly to variable capacitors of the type which are adapted for use in high voltage, high frequency circuits. It is the object of my invention to provide an improved variable capacitor for this purpose which is simple in construction and efficient and reliable in operation. A further object of my invention is the provision of such a capacitor which is free from any appreciable heating when in use such as might cause damage to or break down of the capacitor.

My invention will be better understood from the following description taken in connection with the accompanying drawing, and its scope will be pointed out in the appended claim.

Figure 1:
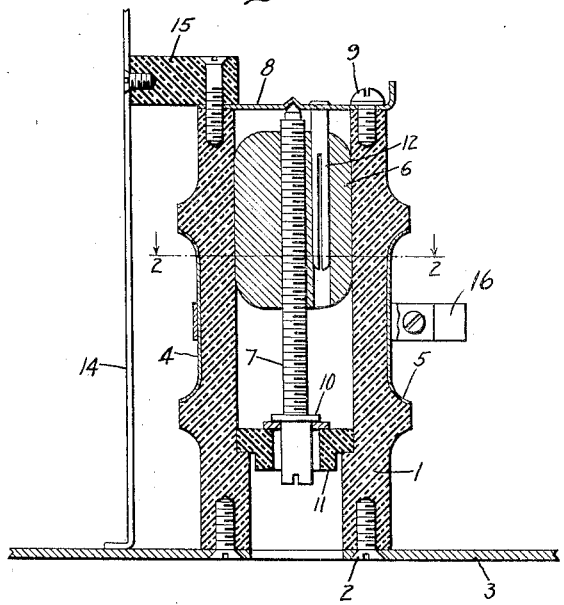
Figure 2:
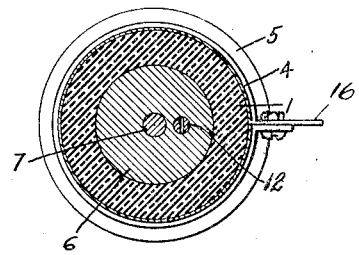

Referring to the drawing, Fig. 1 is a longitudinal cross-section of one embodiment of my invention, and Fig. 2 is a transverse cross-section thereof taken on the line 2—2 of Fig. 1.

The capacitor which I have devised and am about to describe is particularly adapted for use in aircraft radio transmitters where due to the limited available space the dimensions of the capacitor must be kept as small as possible notwithstanding the fact that the capacitor must be capable of being subjected to high frequency and to the highest voltages of the apparatus without danger of arc over.

The dielectric member 1 of the capacitor is in the form of a hollow cylinder and is constructed of a suitable high grade dielectric, preferably one which may be machined readily, such for example as magnesium silicate, a form of which is known to the trade as "Isolantite".

However, various other well known dielectric materials such as those known as "Steatite" or "Mycalex" may be used if desired. The member 1 is shown secured by means of the screws 2 on the support 3 which may be the panel of a radio transmitter. The central or intermediate portion of the outer surface of member 1 is provided with rounded, outwardly flared ends and on this portion lies the metal member 4 constituting one electrode or plate of the capacitor. The member 4 snugly fits the dielectric member 1, thus excluding any air spaces where heating and arcing might occur. At its ends where it conforms to the rounded portions of member 1 it has the rounded, outwardly flaring portions 5 which form integral corona shields. A convenient way of applying the member 4, which preferably is copper, is to plate the member 1 with metal by means of the Schoop spray gun process. It will be understood that if the metal is applied in this manner the member 1 should not be glazed where the metal is applied.

The interior of member 1 has a uniform diameter preferably obtained by grinding, and fitted snugly therein thus excluding any air spaces in the cylindrical member 6 which constitutes the other electrode or plate of the capacitor and which is adapted to be moved longitudinally toward or away from the electrode 4. Member 6 also is provided with rounded ends which flare inwardly thus forming integral corona shields. This member is adjusted longitudinally by means of the screw 7 which is threaded therethrough. One end of the screw engages the resilient metal terminal plate 8 which is secured by the screws 9 to member 1 and the other end has the shoulder 10 which through a washer bears against the bushing 11 cemented in member 1. The opening in bushing 11 is somewhat larger than the screw head whereby the member 6 may be self-centering. Adjustment of the screw may be effected by a screw-driver applied through an opening in the panel 3. To prevent rotation of the member 6 and also to secure a better electrical connection between it and the terminal plate 8 I have provided the split pin 12 which is fixed at one end to the plate and engages in a suitable opening in member 6 at its other or split end. At 14 I have shown a shield which is fixed at one end to the panel 3 and is fastened at the other end to the capacitor by means of the block 15. At 16 I have shown a terminal clamp engaging the member 4.

By the above described construction it will be seen that I have provided a capacitor which by reason of the integral flared end portions of its electrodes forming corona shields is well adapted to be employed in high voltage, high frequency circuits; also by reason of the fact that both electrodes make a snug fit with the dielectric member therebetween no air spaces exist where heating and possible arcing may occur which finally might destroy the capacitor.

I have chosen the particular embodiment described above as illustrative of my invention and it will be apparent that various other modifications may be made without departing from the spirit and scope of my invention which modifications I aim to cover by the appended claim.

What I claim as new and desire to secure by Letters Patent of the United States, is:

A variable capacitor comprising a hollow cylindrical dielectric member, an inner cylindrical conducting member fitting within the dielectric member and having inwardly flared end portions, a cylindrical conducting member fitting the exterior surface of said dielectric member and having outwardly flared end portions, said dielectric member having annular portions fitting said outwardly flared end portions, an adjusting screw threaded in said inner conducting member, a conducting end plate on said dielectric member providing a bearing for said screw and a conducting pin secured to said plate and engaging said inner conducting member to prevent rotation thereof, said pin having a split end portion resiliently engaging the inner conducting member.

PAUL J. SCHWARZHAUPT.